United States Patent [19]

Vermilion, Jr.

[11] 4,064,038
[45] Dec. 20, 1977

[54] FLUID CATALYTIC CRACKING PROCESS FOR CONVERSION OF RESIDUAL OILS

[75] Inventor: Willas L. Vermilion, Jr., Arlington Heights, Ill.

[73] Assignee: Universal Oil Products Company, Des Plaines, Ill.

[21] Appl. No.: 516,520

[22] Filed: Oct. 21, 1974

Related U.S. Application Data

[63] Continuation-in-part of Ser. No. 361,910, May 21, 1973, abandoned.

[51] Int. Cl.² .................. C10G 11/04; B01J 8/24; B01J 29/12
[52] U.S. Cl. ..................... 208/120; 208/164; 208/215 R; 252/417
[58] Field of Search .............. 208/113, 120

[56] References Cited

U.S. PATENT DOCUMENTS

| | | | |
|---|---|---|---|
| 2,382,382 | 8/1945 | Carlsmith et al. | 252/417 |
| 2,902,432 | 9/1959 | Codet et al. | 208/113 |
| 3,494,858 | 2/1970 | Luckenbach | 208/164 |
| 3,563,911 | 2/1971 | Pfeiffer et al. | 252/417 |
| 3,679,576 | 7/1972 | McDonald | 208/74 |
| 3,785,962 | 1/1974 | Conner et al. | 208/164 |
| 3,791,962 | 2/1974 | Demmel et al. | 208/80 |
| 3,808,121 | 4/1974 | Wilson | 208/113 |
| 3,838,036 | 9/1974 | Stine et al. | 208/120 |
| 3,844,973 | 10/1974 | Stine et al. | 252/417 |
| 3,847,793 | 11/1974 | Schwartz et al. | 208/70 |
| 3,849,291 | 11/1974 | Owen | 208/78 |
| 3,862,898 | 1/1975 | Boyd et al. | 208/113 X |
| 3,886,060 | 5/1975 | Owen | 208/120 |
| 3,894,932 | 7/1975 | Owen | 208/74 |
| 3,898,050 | 8/1975 | Strother | 208/164 X |
| 3,909,392 | 9/1975 | Horecky et al. | 208/120 |
| 3,919,115 | 11/1975 | Stine et al. | 252/417 |

Primary Examiner—Delbert E. Gantz
Assistant Examiner—G. E. Schmitkons
Attorney, Agent, or Firm—James R. Hoatson, Jr.; Thomas K. McBride; William H. Page, II

[57] ABSTRACT

A fluid catalytic cracking process employing in combination a riser reaction zone and a CO-burning regeneration zone for the conversion of a feedstream comprising a residual oil to a distillate fuel.

2 Claims, 1 Drawing Figure

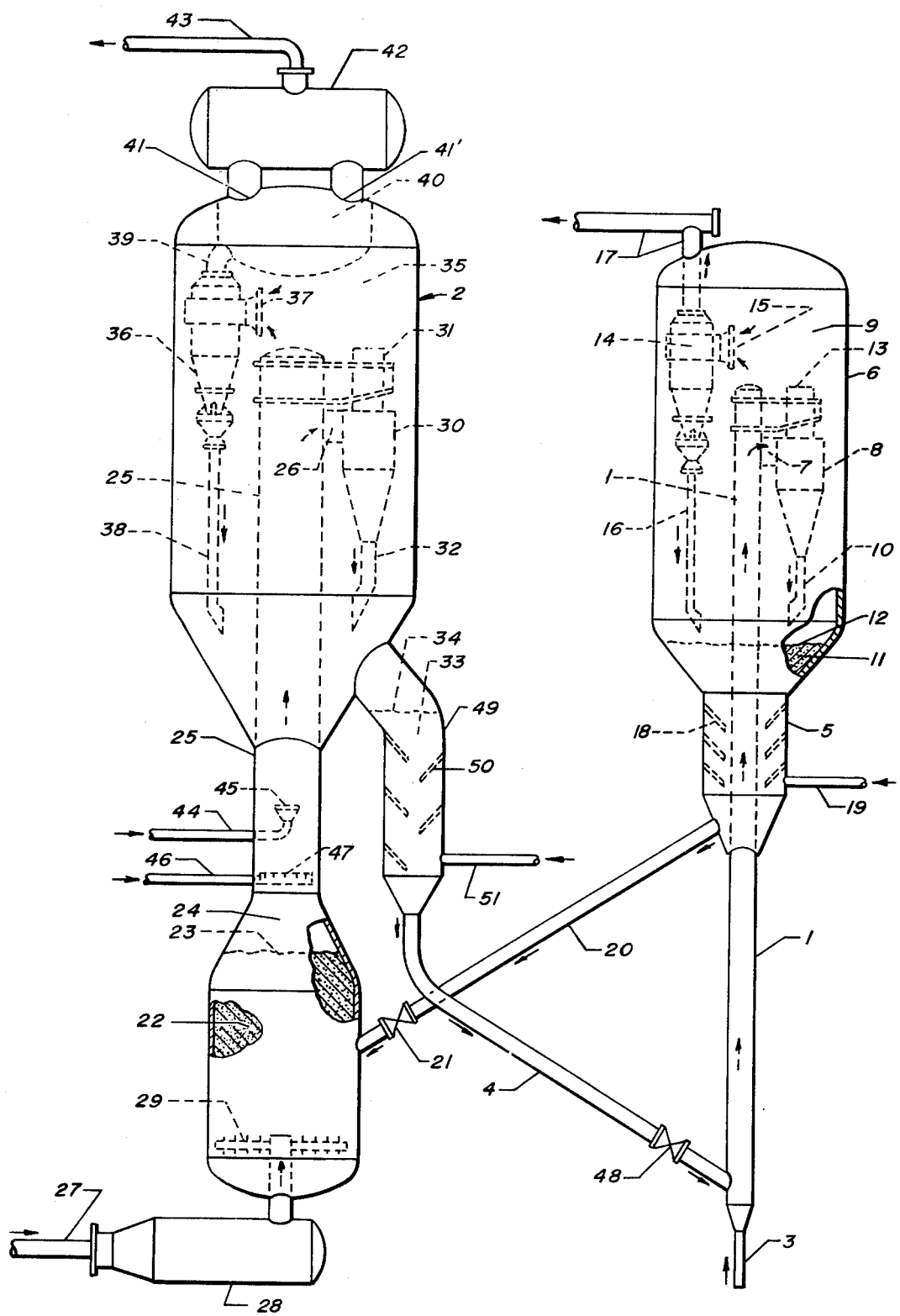

FLUID CATALYTIC CRACKING PROCESS FOR CONVERSION OF RESIDUAL OILS

CROSS-REFERENCE TO RELATED APPLICATIONS

This application is a continuation-in-part application of my copending application Ser. No. 361,910 filed May 21, 1973 (now abandoned), all the teachings of which are incorporated herein by specific reference thereto.

BACKGROUND OF THE INVENTION

1. Field of the Invention

The field of art to which this invention pertains is hydrocarbon processing. Specifically this invention relates to a fluid catalytic cracking process in which hydrocarbon feed streams comprising residual oils are converted to distillate fuels.

2. Prior Art

The fluid catalytic cracking process has for many years been considered one of the major gasoline producers for the refining industry. Typically the feedstocks employed have been gas oils and operating conditions have been selected for relatively high conversion of the gas oil feedstocks to permit maximum yields of gasoline. The cracking of gas oils to gasoline is fairly well understood and the limitations imposed on the feedstock gas oils are quite well defined. The major limitations currently placed on gas oil feedstocks are the amount of carbon or "coke" precursors and the amount of metallic compounds contained in the feedstocks.

These coke formers or precursors, which are typically high molecular weight condensed ring hydrocarbons, are primarily a function of the crude type (aromatic, naphthenic, or paraffinic) and the boiling range of the material. Results obtained by Conradson or Ramsbottom coke analyses represent approximate measures of these compounds and of the coking propensity of the raw oil. Normally it is desirable to limit the gas oil feedstocks to 0.5 wt. % or less by the Conradson method. The reason is that circulating cracking catalyst is an excellent coke remover and as the coke precursor compounds in the gas oil are permitted to increase much more coke is deposited on the catalyst in the hydrocarbon reaction zone than is required for the process heat balance. Temperatures in the regeneration zone, where the coke is oxidized from the catalyst, can become excessive and, equally important, the catalyst particle temperatures can rise to the point that the catalytic structure is damaged or destroyed with a resulting loss in activity.

The second major limitation imposed on gas oils is the content of organic nickel, vanadium, and iron compounds. These materials, commonly called "porphyrins," are distilled into the high boiling fractions of vacuum gas oils. Typically, the metal content is limited to the extent that the metals factors, defined by the equation $F_m = (10$ wt-ppm Ni$) + $ wt-ppm $(V + $ Fe$)$, is less than 2.5. As with the carbon precursors, the circulating catalyst adsorbs these metals almost completely and becomes "poisoned." These metals, in their active state on the catalyst, depress the yield of primary gasoline product, promote various dehydrogenation reactions, and can produce large quantities of hydrogen and coke. This can lead to tremendous increases in volumes of unwanted gases and very quickly overload gas compressors and gas recovery facilities.

When one compares residual oils such as whole crudes or atmospheric reduced crudes to typical gas oils, it is apparent that in addition to being more difficult if not impossible to vaporize completely, the residual oils contain higher amounts of "coke"]precursors (as determined by coke analyses) and larger quantities of metals Ni, V, and Fe. In spite of the potential processing difficulties imposed by the presence of such contaminants, the refiner has been prompted by the tightening of crude supplies to expand the characteristics of the feedstock charged to the FCC process beyond those of the relatively clean gas oils presently being processed. In order to increase charge stock availability to meet gasoline and fuel oil demands higher-boiling feeds which were previously considered only marginal or unsuitable because of such contaminants are receiving substantial considerations.

Although my invention is concerned with the processing of these more contaminated feedstocks, no novelty is asserted in the processing of such feedstocks in a conventional FCC process. While such processing in a conventional FCC process is not common, a relatively few operations throughout the world have been processing feedstocks containing reduced crudes on a daily basis. Likewise no novelty is asserted in any of the individual components of my process; rather my invention resides in a novel combination of a riser reaction zone and a CO-burning regenerator for processing, in a more efficient and economical manner feedstocks comprising residual oils to produce distillate fuels. In a preferred embodiment my invention permits the processing of the more typical reduced crudes which contain more Conradson carbon and more metal contaminants than do the conventional gas oils and typical reduced crudes now being processed.

SUMMARY OF THE INVENTION

It is, accordingly, a broad objective of my invention to provide a more economical fluid catalytic cracking process for the conversion of a feedstream comprising a residual oil to a distillate fuel. It is another objective of my invention to provide a fluid catalytic cracking process capable of processing feedstocks comprising the more typical residual oils, such as reduced crudes which contain relatively high amounts of Conradson carbon and metal contaminants. Even more specifically, it is an objective of my invention to provide in a preferred embodiment a fluid catalytic cracking process comprising in a combination a quick quench-riser reaction zone and a particular CO-burning regeneration zone uniquely suited for the conversion of a feedstream comprising residual oil to distillate fuel in that at least a portion of the heat of CO combustion is recovered for use within the process and in which catalyst makeup rates required for activity maintenance are minimized.

In brief summary then, my invention is, in one embodiment, a fluid catalytic cracking process comprising the steps of: (a) contacting a feedstream comprising a residual oil with regenerated catalyst in a riser reaction zone maintained at catalytic cracking conditions and passing the feedstream and catalyst through the reaction zone to form a mixture consisting of spent catalyst and hydrocarbons; (b) discharging the mixture into separation means at separation conditions to effect the separation of hydrocarbons from spent catalyst and recovering the hydrocarbons; (c) passing spent catalyst from said separation means into a spent catalyst stripping zone and therein stripping spent catalyst at stripping conditions to remove adsorbed and interstitial hydrocarbons therefrom to form stripped spent catalyst containing coke thereon; (d) passing at least a portion of stripped spent catalyst into a regeneration zone maintained at oxidizing conditions and therein oxidizing coke from said catalyst by passing a regeneration gas upwardly through a fluidized bed of the spent catalyst, thereby forming an upwardly flowing suspension of freshly regenerated catalyst and partially spent regeneration gas containing CO; and, (e) oxidizing said CO in the suspension to $CO_2$ and transferring heat of combustion of CO to regenerated catalyst to said reaction zone of step (a) above.

Other embodiments and objects of the present invention encompass details about feedstocks, the riser reaction zone, the CO-burning regeneration zone, and operating conditions all of which are hereinafter disclosed in the following discussion of each of these facets of the present invention.

DESCRIPTION OF THE DRAWING

Having thus described the invention in brief general terms, reference is now made to the schematic drawing of the preferred embodiment of my invention in order to provide a better understanding of the process of the present invention. It is to be understood that the drawing is shown only in such details as are necessary for a clear understanding of the invention and that no intention is made thereby to unduly limit the scope of this invention. Various items such as valves, pumps, compressors, steam lines, instrumentation, and other process equipment and control means have been omitted therefrom for the sake of simplicity. Variations obvious to those having ordinary skill in the art of fluid catalytic cracking processes are included within the broad scope of the present invention.

The drawing shows a fluid catalytic cracking process basically comprising a short-time dilute-phase quick-quench riser reaction zone 1 and a regeneration zone 2 with interconnecting conduits.

The feedstock containing the residual oil, which may be preheated by a fired heater or system of heat exchangers not shown, enters the lower end of riser reaction zone 1 through line 3 while regenerated catalyst enters the lower end of reaction zone 1 through regenerated catalyst conduit 4. Conversion of the feed takes place in the presence of regenerated catalyst while the feed and catalyst mixture passes upward through riser reaction zone 1 which extends vertically through spent catalyst stripper 5 and into reception vessel 6. Reaction products plus unconverted feed, if any, pass out of riser reaction zone 1 via opening 7 directly into cyclone separator 8 located in disengaging space 9 within reception vessel 6. Hydrocarbon vapors and catalyst are separated in cyclone separator 8 and separated catalyst is passed through dipleg 10 downward toward dense bed 11 which has an interface indicated at 12. Hydrocarbon vapors and any inert leave separator 8 via outlet 13 and pass into disengaging space 9. These vapors plus any entrained catalyst then enter cyclone separator 14 through inlet 15 and catalyst and vapors are again separated. Separated catalyst passes downward toward dense bed 11 through dipleg 16 and vapor passes out of cyclone separator 14 and out of vessel 6 through conduit 17 toward the main fractionating column and gas recovery and purification process not shown. Although the drawing shows only one cyclone separator attached to riser reaction zone 1 and one other in disengaging space 9, more than one could of course be employed in either or both locations as the volume and catalyst loading of the vapor stream and the desired degree of separation dictate.

Catalyst in dense bed 11, flowing in a downward direction, passes through catalyst stripper 5 over baffles 18 and is stripped of adsorbed and interstitial hydrocarbons by a counter-current stream of stripping medium, generally steam, which enters the catalyst stripper through line 19. Stripped catalyst leaves stripper 5 through spent catalyst standpipe 20. Control means 21, typically a slide valve, on standpipe 20, controls the amounts of catalyst flowing through the standpipe.

Stripped spent catalyst passes into first dense bed 22 of regeneration zone 2 via spent catalyst standpipe 20. First dense bed 22 has a level or interface 23 which is located in a transitional region 24 positioned between first dense bed 22 and diluted phase transport riser 25. A controlled stream of fresh regeneration gas is introduced via line 27 and fresh regeneration gas heater 28 into dense bed 22 through distributing device 29 which allows the fresh regeration gas to be readily dispersed with the dense bed 22. Fresh regeneration gas heater 28 will typically only be used during start-up to assist in increasing the regeneration zone 2 temperature to near operating temperature although it may be used during normal operation. Distributing device 29 will preferably be a pipe grid arrangement although a metal plate containing holes or slots could also be used. Oxidation of the carbonaceous deposits on the spent catalyst takes place in dense bed 22 to produce partially spent regeneration gas and regenerated catalyst which are then carried out of bed 22 through the transition region 24 into dilute phase transport riser 25 wherein essentially complete oxidation of CO to $CO_2$ takes place to produce spent regeneration gas and where the heat of combustion of the CO to $CO_2$ is transferred to the catalyst being transported.

Transport riser 25 is vertically positioned having its inlet at the lower portion and its outlet means 26 near its top portion. Outlet means 26 may be single or multiple openings located at or near the uppermost portion of transport riser 25 which allow regenerated catalyst and spent regeneration gas to pass out of transport riser 25. As shown in the drawing cyclone separator 30 is attached to the outlet 26 of transport riser 25. Cyclone separator 30 is used to achieve a substantial separation of spent regeneration gas and entrained catalyst which pass out of transport riser 25. Although the drawing shows only one such cyclone separator attached to the transport riser 25, it is contemplated that from 1 to 4 cyclones could be so positioned. Spent regeneration gas, substantially free of catalyst, passes out of the cyclone separator 30 through outlet 31 while catalyst passes through dipleg 32 downward toward second dense bed 33 which has an interface indicated at 34. Optionally, cyclone separator 30 could be omitted leaving regeneration gas and catalyst exiting outlet means 26 to directly enter disengaging space 35. Some separation of regeneration gas and catalyst would be achieved but not as efficiently as with cyclone separator 30 as shown.

Cyclone separator 36 has an inlet 37 which receives regeneration gas and any entrained catalyst located in the disengaging space 35. Regeneration gas and any entrained catalyst are substantially separated from each other with the spent regeneration gas passing out of the separator 36 at outlet 39 into plenum chamber 40 and then out the plenum chamber and the regeneration zone via spent regeneration gas outlets 41 and 41'. Spent regeneration gas can then pass through steam generator 42 where part of the sensible heat of the gas can be utilized for steam generation. Spent regeneration gas will then leave steam generator 42 via outlet line 43. Catalyst separated from the regeneration gas is passed via dipleg 38 downward toward second dense bed 33.

An external combustion fluid such as fuel gas or a liquid hydrocarbon stream may be admitted to the transport riser 25 through line 44 via distributor 45. The burning of such a fluid may be necessary to assist in initial process start-up or to increase the temperature within the dilute phase transport zone 25 sufficiently to initiate CO oxidation. Additionally, a second stream of fresh regeneration gas may optionally be admitted to the transport riser 25 through line 46 via distributor 47. This fresh regeneration gas stream may be for the purpose of ensuring sufficient oxygen for the essentially complete conversion of CO to $CO_2$.

Second dense bed 33 is so positioned in relationship to the first dense bed 22 as to maintain a sufficient head of regenerated catalyst necessary to overcome any pressure drop in regenerated catalyst conduit 4, control valve 48, and in any equipment downstream connected to conduit 4. Although the drawing shows the second dense bed 33 positioned almost immediately above the first dense bed 22, they may be separated by a sufficient distance to provide this head. Furthermore, the level 34 of catalyst within the second dense bed 33 may be controlled as to provide the desired residence time within the bed.

The regenerated catalyst in second dense bed 33 moves in a downward direction and passes out of the regeneration zone 2 through regenerated catalyst stripper 49 which contains baffles 50. A stripping medium will be admitted through line 51 to strip in a countercurrent fashion adsorbed and interstitial regeneration gas from the regenerated catalyst as it flows downward over the baffles 50. Generally the stripping medium will be steam.

DESCRIPTION OF THE INVENTION

The term "residual oil" as used herein shall mean any hydrocarbon, regardless of its initial boiling point, which includes heavy bottoms, such as tars, asphalts, asphaltenes, resins, etc. Accordingly, a residual oil can be a whole crude, an atmospheric reduced crude, or even the bottoms fraction, boiling above about 1050°–1100° F., remaining after vacuum column distillation. The more preferred residual oils are, however, whole crudes and atmospheric reduced crudes.

By the term "whole crude" is meant a petroleum or other mineral hydrocarbon oil which has constituents in the full range of liquid hydrocarbons and which has not been processed except perhaps for desalting. The term "atmospheric reduced crude" shall mean the portion of the whole crude remaining after one or more fractions have been removed by distillation at atmospheric pressure. Typically, these fractions removed at atmospheric pressure are gasoline, kerosine, and gas oil having approximate boiling ranges of from 100° F. to 425° F., 425° F. to 550° F., and 550° F. to about 750° F. respectively. It is of course understood that the boiling ranges of these fractions can vary and that other fractions, such as jet fuel for instance, can essentially bridge two boiling ranges or portions thereof. Thus, a reduced crude might be the entire portion of the crude remaining after the gasoline fraction has been removed by distillation.

In other words, the reduced crude would be the 425° F.+ material which would include the kerosine fraction, the entire gas oil fraction, and the undistillable residual fuel oil or atmospheric column bottoms fraction. This particular reduced crude is typically called a "whole topped crude". Alternatively, other reduced crudes may be the portion remaining after the kerosine and lighter fractions have been removed or may be the portion of the crude remaining undistilled after the gas oil fraction and lighter fractions have been removed by atmospheric distillation.

All of the residual oils will contain varying amounts of asphaltene, resins, and organometallic compounds. Carbon residue analyses and metal analyses provide measures of the amounts of coke or carbon formers such as tars, asphaltenes, and resins and metals such as Ni and V present in the residual oils. Such analyses therefore provide ways to describe or characterize the residual oils. More importantly, as hereinafter discussed, the carbon residue content and metals content of the residual oil have a direct bearing on process operating conditions which can be employed and upon the catalyst makeup rate. The two commonly used tests for carbon residue are the Conradson Carbon Residue of Petroleum Products test, ASTM Designation D189-65, and the Ramsbottom Carbon Residue of Petroleum Products test, ASTM Designation D524-64. The metals may be determined by methods equally well known to the petroleum refining industry. The carbon residue of the residual oils may vary from a few tenths of a weight percent up to 20 weight percent or more and the metals content may vary from about 1 weight ppm. or less, Ni, V, and Fe to several thousand weight ppm. Ni, V, and Fe. More typically however, the preferred residual oils such as reduced crudes will contain from about 2 to about 12 weight percent Conradson carbon and from about 25 to about 500 weight ppm. Ni, V, and Fe.

The amount of residual oil in the feedstream charge to the process of my invention can comprise from a few liquid volume percent (LV%) to 100 LV% of the total feedstream but more preferably will comprise from about 30 LV% to 100 LV% and even more preferably will comprise 100 LV% of the total feedstream. The remainder of the feedstream could be, for instance, any of the relatively clean gas oils presently being used as FCC feedstreams. It is therefore apparent that the carbon residue content and metals content of the feedstream will depend directly upon the amount and type of residual oil in the feedstream. When the feedstream typically and preferably comprises 100 LV% of a reduced crude the metals and carbon residue contents will be those of the reduced crude. Thus, the Conradson carbon content and metals content of feedstreams to this process will be at least about 2 weight percent and at least about 25 weight ppm., respectively.

In the FCC processing of any feedstream, coke is deposited on the catalyst in the reaction zone and subsequently removed by oxidation in a regeneration zone. Generally speaking, since the regeneration zone is essentially adiabatic, as the amount of coke depositied on the catalyst in the reaction zone increases, the temperature in the regeneration zone increases. With large amounts of coke deposited on the catalyst it is possible that temperatures in the regeneration zone can become excessive resulting in possible damage to regeneration zone internals and possible damage to the catalyst as a result of high catalyst particle temperatures. While means, such as heat dissipation coils, can be employed in the regeneration zone to help remove the excess heat beyond that which is required for the process heat balance, the total amount of coke deposited on the catalyst must be carefully considered so as not to exceed the total of that required for heat balance plus that which can be reasonably removed by such removal means.

The Conradson carbon content of the feedstream is especially important not only because it becomes one of three kinds of coke deposited on the catalyst, but because it is the biggest contributor to the total coke deposited on the catalyst. The second type of coke deposited on the catalyst is "catalyst-to-oil coke" which results from hydrocarbon carryover from the reactor to the regenerator and which varies in amount with the catalyst circulation rate or the catalyst-to-oil ratio. The third kind of coke is "catalytic coke" which is a product of the cracking reactions in the hydrocarbon reaction zone.

At low conversions of from about 20 to about 50 LV%, catalytic coke can be minimized and the total coke deposition can therefore be relatively modest. Total coke depositions at conversions within this range are usually somewhat less than the Conradson carbon content of the feedstream but at conversions greater than about 50% more coke than is indicated by the feedstream Conradson carbon content is produced. The preferred conversion range for this process will therefore be from about 20 to about 50 volume percent so that the amount of catalytic coke can be minimized. More specifically for any particular feedstream catalytic cracking conditions in the hydrocarbons reaction zone will be selected to produce conversion levels such that the coke yield from the FCC process will be numerically less than the sum of the Conradson carbon content of the feedstream plus about 4 weight percent. The amount of coke represented by this limitation when oxidized in the regeneration zone will produce an amount of heat in excess of that required for heat balance which can reasonably be removed from the process with heat dissipation means.

Many combinations of catalytic cracking conditions are possible to achieve the desired conversion level or more properly this coke yield limitation. Certainly those skilled in the art of fluid catalytic cracking recognize that for a given feedstream such variables as temperature, residence time, catalyst to oil ratio, and catalyst activity all effect the conversion level. Preferred catalytic cracking conditions for this process will include a temperature within the range of from about 850° F. to about 1000° F., a pressure within the range of from about atmospheric to about 40 psig., a hydrocarbon residence time of less than about 10 seconds, and a catalyst to oil ratio of from about 3 to about 6. Additionally, a diluent such as steam, nitrogen, naphtha, or other light hydrocarbons having a boiling point generally lower than naphtha can be used to lower the partial pressure of the hydrocarbon feed for the purpose of increasing yields of more valuable products. Catalysts which can be employed in the process shall be limited to the zeolite-containing FCC catalyst because of their better selectivity and temperature stability. Since this process is concerned with low conversion operations, catalysts possessing high activity are generally not desirable and the lower activity (and hence less expensive) zeolite-containing catalysts are therefore preferred.

The so called "riser reactor" or "riser reaction zone" is ideal for processing feedstreams comprising residual oils. Such hydrocarbon reaction zones are characterized by the absence of a dense catalyst bed, by cocurrent dilute-phase flow of catalyst and hydrocarbon, and by short catalyst and hydrocarbon residence times. Short residence times are necessary to limit coke deposits and the effect of metal contaminants on the catalyst.

As an additional means of avoiding or minimizing secondary reactions which lead to increased coke and inferior product properties, the process of my invention recognizes the importance of quick, positive separation of the hydrocarbon and catalyst mixture leaving the riser reaction zone to quench the reaction. Indeed, if timely separation of hydrocarbon and catalyst does not occur before the occurrence of a significant amount of aftercracking, at least a portion of the advantage of the short-time dilute-phase riser reaction zone can be lost. The process of this invention therefore requires substantially instantaneous separation of catalyst and hydrocarbon as these materials exit from the reaction zone as another means of reducing the coke yield. This separation will be achieved by separation means which, as the term is used herein, is defined as any device or method capable of effecting quick, essentially complete separation of catalyst particles from gases and hydrocarbon vapors. Typically, such separation means will be cyclone separators, devices which have been used for years and whose operation and design are well known to those skilled in the art of FCC processing. Alternatively, electrostatic precipitators or cyclone separators combined with such precipitators could be used. Other means capable of separating solid particles from gases may also be employed. This quick positive separation feature of the process of my invention is referred to as "quick-quench". The term "quick-quench riser reaction zone" as used herein shall therefore mean a fluid catalytic cracking reaction zone which is characterized by the absence of a dense catalyst bed, by cocurrent dilute phase flow of catalyst and hydrocarbon, by short catalyst and hydrocarbon residence time and additionally by this quick positive separation of hydrocarbon and catalyst.

"Spent catalyst" as used herein of course means catalyst which has been contaminated with coke in the hydrocarbon reaction zone. Spent catalyst typically contains from about 0.5 to 1.0 weight percent coke. The spent catalyst leaves the hydrocarbon reaction zone and passes into a regeneration zone along with a fresh regeneration gas stream wherein combustion of coke produces regenerated catalyst and, in a conventional regeneration zone, a flue gas containing approximately equal amounts of each of carbon monoxide and carbon dioxide. "Regenerated catalyst", catalyst which contains a reduced quantity of coke as compared to spent catalyst, will generally contain less than about 0.5 weight percent coke and more typically, when produced in a conventional regeneration zone, from about 0.2 to about 0.4 weight percent coke. When produced in a Co-burning regeneration zone, the regenerated catalyst will contain a lower amount of residual coke, typically from about 0.01 wt. % to about 0.1 wt. %. The term "fresh regeneration gas" shall mean free-oxygen-containing gases such as air or oxygen-enriched or deficient air which pass into the dense bed of the regeneration zone to allow oxidation of coke on the spent catalyst therein. The flue gas will generally contain from about 7 to about 13 volume percent each of CO and $CO_2$ along with various amounts of water, nitrogen, and perhaps a small quantity of oxygen.

Flue gas from a conventional regeneration zone is generally separated from entrained regenerated catalyst by separation means, typically cyclones, located within the regeneration zone and separated flue gas is passed from the regeneration zone typically to a carbon monoxide boiler wherein the chemical heat of carbon monoxide is recovered outside of the regeneration zone by combustion as a fuel for the production of steam. Indeed, conventional regeneration zones are operated to essentially preclude the combustion of CO to $CO_2$ anywhere within the regeneration zone. Regenerated catalyst which was separated from the flue gas is returned to the lower portion of the regeneration zone which is maintained as a dense bed of catalyst. Regenerated catalyst leaves this dense bed and as previously mentioned, contacts the feedstock in the reaction zone. Generally, regenerated catalyst is not stripped of entrained flue gas prior to contacting the feed.

In a typical conventional regeneration zone, the spent catalyst is introduced into and is maintained in the bottom portion of the zone in a single or multiple dense bed by limiting the superficial velocity of the incoming fresh regeneration gas. Regenerated catalyst is withdrawn from the same bottom portion of the regeneration zone. The superficial velocity is limited to the transport velocity, that is, the velocity past which the catalyst would be carried out of the dense bed upwardly to the catalyst separation means located in a rather large dilute-phase region positioned above and in communication with the dense bed or beds. Typical velocities are, therefore, less than about 3 feet per second with 1.5 to 2.5 being the usual range.

Most of the total catalyst inventory of any fluid catalytic cracking process is contained in the regeneration zone. The determination of the inventory in a typical conventional regeneration zone is based upon the feed rate to the FCC process (or more specifically, to the coke yield expected from that feed rate) and the superficial velocity of the fresh regeneration gas. This coke yield anticipated from a desired feed rate determines the amount of the fresh regeneration gas that must be passed into the regeneration zone for coke oxidation. This amount of gas at a limiting superficial velocity then determines the cross-sectional area of the regeneration zone. With a known catalyst density and height of the dense bed, the inventory of the regeneration zone, and for practical purposes for the FCC process, is fixed. Catalyst residence times which result for these conventional regeneration zones are generally from about 2 to 5 minutes with about 2 to 3 being the general range.

The process of this invention employs a CO-burning regeneration zone in which coke from spent catalyst and CO, resulting from the oxidation of coke, are both oxidized in the presence of fresh regeneration gas to produce regenerated catalyst and spent regeneration gas. Additionally, at least a portion of the heat of combustion of CO is transferred to the regenerated catalyst. The term "regeneration gas" as used herein shall mean, in a generic sense, any gas which is to contact catalyst or which has contacted catalyst within the regeneration zone. "Spent regeneration gas" shall mean regeneration gas which contains substantially no carbon monoxide (generally less than about 500 ppm.), from about a few tenths up to as much as about 15 mole percent free oxygen, carbon dioxide, nitrogen, and water.

Normally, the CO as part of the flue gas is directed to a CO boiler located downstream from the FCC process and the heat of combustion is not recovered by the FCC process itself but is used to make steam. In this invention, CO is essentially completely converted to $CO_2$ and a portion of the heat of combustion is recovered for use within the FCC process itself. This combustion of CO within the regeneration zone essentially eliminates CO pollution of the atmosphere without the need for a CO boiler and in many instances, because of the hotter regenerated catalyst, permits either a reduction in feed preheat or higher hydrocarbon reaction zone temperatures at the same preheat temperature. At the same time, since higher regenerated catalyst temperatures are produced, the reactor catalyst to oil ratio required for a given hydrocarbon reaction zone temperature is reduced and the coke yield is therefore reduced. This advantage is of particular significance in the process of this invention where it is especially desired that the coke yield be reduced.

Regeneration zones in which spent catalyst is introduced into and maintained in the bottom portion of the zone in one or more dense beds by limiting the superficial velocity of the incoming fresh regeneration gas to less than the transport velocity can be used in the process of the invention. The operation of such regeneration zones in this process will be distinguished, however, from their usual operations. In this process such regeneration zones will be operated at oxidizing conditions such that CO, produced by the oxidation of coke, will be essentially completely converted to $CO_2$ within the dense bed. In this type of regeneration zone oxidizing conditions will include a temperature within the range of from about 1150° F. to about 1550° F. and more preferably within the range of about 1275° F. to 1400° F. Additionally, the pressure will be from about atmospheric to about 50 psig. and the catalyst residence time from about 2 to about 5 minutes.

In the preferred embodiment of this process a particular regeneration zone comprising a first dense bed, a dilute phase transport riser, and a second dense bed is employed, for reasons hereinafter discussed, for achieving both coke and CO oxidation. In this regeneration zone spent catalyst is passed into a first dense bed along with a fresh regeneration gas stream and coke is oxidized therein to produce regenerated catalyst and partially spent regeneration gas. "Partially spent regeneration gas" is regeneration gas which has contacted catalyst within the dense bed and which contains a reduced quantity of free oxygen as compared with fresh regeneration gas. Typically the partially spend regeneration gas contains water, nitrogen, oxygen, carbon monoxide, and carbon dioxide. Partially spent regeneration gas and regenerated catalyst are transported upwardly from the first dense bed to a dilute phase transport riser of smaller cross-sectional area than the bed where essentially complete CO oxidation takes place and where the heat of combustion of the CO is transferred to the catalyst. Catalyst residence time in the transport riser is sufficiently short to preclude further substantial oxidation of any residual coke on the regenerated catalysts to produce additional CO. Catalysts and spent regeneration gas leaving the transport riser are separated by separation means such as cyclone separators and the regenerated catalyst is passed to a second dense bed where the catalyst can be stripped of entrained regeneration gas and from which at least a portion of the regenerated catalyst is returned to the hydrocarbon reaction zone.

In any hydrocarbon conversion process where the feed stream contains components which have an adverse affect on the activity of the catalyst used in the process, the cost of maintaining catalyst activity above some minimum level, whether by catalyst replacement or regeneration or both, is a prime factor in the overall process economics. This is especially true of those catalytic processes charging residual oils rich in metals such as Fe, Ni, and V, which generally irreversibly "poison" the catalyst thereby making necessary catalyst activity maintenance by replacement rather than by regeneration. The amount of catalyst poisoned varies directly with the metals content of the feedstream. Total catalyst cost will be the sum of the initial inventory of catalyst in the process plus the cost of catalyst required to make up physical losses and maintain activity. Indeed, a large percentage of the daily operating expense of a process may be attributable to catalyst replacement. It is therefore apparent that reductions in process catalyst costs will be reflected directly in improved process economics.

The preferred embodiment of the process of this invention permits such a reduction in catalyst cost as compared to a conventional FCC process charging the same feedstock. Although some of the reduction is attributable to the absence of a dense catalyst bed in the hydrocarbon reaction zone, most of the reduction is due to the use of the particular regeneration zone described above. A reduction of catalyst inventory in the regeneration zone arises because the superficial velocity of the fresh regeneration gas to the first dense bed is not limited to the transport velocity of the dense bed as it is in conventional regeneration zones. It is not intended, as it is in conventional regeneration zones, that catalyst remain in the first dense bed and therefore the superficial velocity of the fresh regeneration gas into that bed can exceed the transport velocity. In the first dense bed superficial velocities will be in the range of about 3 to 10 feet per second so that catalyst can be carried from the first dense bed into the dilute phase transport riser. Since fresh regeneration gas velocity is not limited to the transport velocity, but is in fact 2 to 3 times the critical velocity, dramatic catalyst inventory reductions can now be achieved. Catalyst inventories using the process of this invention will, therefore, be about 40 to 60 percent of present FCC processes having regeneration zones with fresh regeneration gas superficial gas velocities limited to the terminal velocity. As an example of the catalyst cost savings that can be realized, consider that a moderately sized FCC process of the type presently in commercial use will contain about 150 tons of catalyst. By using the regeneration zone of this embodiment of the process of our invention, a refiner could save the initial investment represented by at least 75 tons of catalyst. Since catalyst makeup rates tend to be a percentage of the total catalyst inventory, typically 1 to 2 percent, catalyst makeup rates for this embodiment of the invention will also be reduced from 40 to 60% of those required for typical FCC processes thus representing a considerable savings in process operating cost. Normally, makeup catalyst is added periodically or continuously to the regeneration zone and less active "equilibrium catalyst" is withdrawn periodically from the regeneration zone. Makeup catalyst is usually expressed in terms of pounds of catalyst per barrel of feed to the process.

Better solid-gas contact and reduced residence times of both catalyst and regeneration gas are other advantages of the higher velocity employed in the regeneration zone of the preferred embodiment. Higher velocities will produce more tubulent flow with better mixing hence will result in more efficient regeneration. Because of this better gas-solid contact, along with the higher oxygen partial pressure and higher temperature, the rate of coke combustion will be increased and catalyst residence time can therefore be reduced. Catalyst residence times can be reduced from the present 2 to 5 minutes to less than 2 minutes. With shorter catalyst exposure time to high tempratures, catalyst activity will be prolonged and reduced fresh catalyst makeup rates can result.

From the standpoint of savings to be effected another important result of shorter catalyst residence time is that it now allows the steam stripping of flue gas components from regenerated catalyst thereby permitting a reduction in the size of gas processing equipment located downstream of the FCC process.

Oxidizing conditions employed within the first dense bed will include a temperature within the range of from about 1150° F. to about 1400° F., a superficial gas velocity within the range of about 3 to about 10 feet per second, and a catalyst residence time of less than 2 minutes. Conversion conditions within the dilute phase transport riser will include temperatures within the range of about 1200° F. to about 1500° F. and a superficial gas velocity in the range of from about 10 to about 25 feet per second.

ILLUSTRATIVE EMBODIMENT

The following embodiment is presented to demonstrate the capability of the process of this invention for the conversion of various feedstreams comprising residual oils to distillate fuels and is not intended to limit the scope of the invention.

Since a large part of the crude oil processed now comes from the Middle East and Africa, Kuwait and Gach Saran crude sources were selected for consideration. These crude sources are not only important for their production potential but also cover the wide range of available crudes fairly well.

The properties of atmospheric reduced crudes derived from these crude sources which would be charged to the process of this invention as shown in Table 1.

TABLE 1

| ATMOSPHERIC REDUCED CRUDE PROPERTIES | | |
|---|---|---|
| | Gach Saran | Kuwait |
| Gravity, ° API | 14.8 | 16.5 |
| Sulfur, wt-% | 2.68 | 4.04 |
| Nitrogen, wt-% | 0.468 | 0.205 |
| Molecular Weight | 532 | 491 |
| Metals, ppm | | |
| Nickel | 45 | 12 |
| Vanadium | 255 | 55 |
| Conradson Carbon, wt-% | 10.93 | 9.31 |
| Kinematic Viscosity at 210° F | 50.72 | 27.09 |
| ASTM D 1160 | | |
| Distillation, ° F | | |
| IMP | 490 | 480 |
| 5% | 650 | 620 |
| 10% | 718 | 667 |
| 20% | 792 | 735 |
| 30% | 855 | 796 |
| 40% | 917 | 861 |
| 50% | 985 | 939 |
| 60% | 1051 | 1012 |
| 65% | — | 1050 |

Note in particular the very high metals content and Conradson carbon content as compared to typical "clean" gas oil FCC feestreams. Note also that neither one is 100% distillable.

Table 2 shows estimates of yields which would be obtained by charging the Gach Saran and Kuwait reduced crudes to the process of this invention. The estimates are for 45% conversion with low activity zeolite-containing catalyst. Note that the coke yields of 13.5 and 13.0 wt. %, respectively, are slightly less numerically than the sum of the Conradson carbon content of the respective feedstreams plus 4 wt. % coke. These coke yields are higher than those required for heat balance of once-through operations. The heat in excess of that required for heat balance must, therefore, be removed from the regenerator and will result in the production of high pressure steam.

TABLE 2

FCC YIELD ESTIMATES
Low Activity Zeolite Catalyst
45% Conversion

| Resid Charge Products | Gach Saran | Kuwait |
|---|---|---|
| $H_2S$, wt-% | 1.0 | 1.4 |
| $C_2^-$, wt-% | 1.8 | 1.6 |
| $C_3$'s, vol-% | 6.9 | 5.4 |
| $C_4$'s, vol-% | 8.3 | 7.8 |
| $C_5$ to 380 at 90% Gasoline, vol-% | 28.9 | 30.0 |
| Total Cycle Oils, vol-% | 55.0 | 55.0 |
| Coke, wt-% | 13.5 | 13.0 |
| $C_3^+$, vol-% | 98.2 | 98.2 |

The estimated product qualities for the primary products are shown in Tables 3 and 4. Table 3 shows estimated gasoline properties for a 380 at 90% gasoline (430 EP). Sulfur content of the gasoline could be reduced to 0.2 and 0.31 wt-%., respectively, for Gach Saran and Kuwait if 400 EP gasoline were produced. This, of course, would decrease gasoline yield and increase cycle oil yield by about 2 vol-%.

TABLE 3

ESTIMATED FCC GASOLINE PROPERTIES
50,000 PBD Atmospheric Reduced Crude Charge
45% Conversion

| Gasoline | Gach Saran | Kuwait |
|---|---|---|
| BPD | 14,450 | 15,000 |
| Gravity, °API | 53 | 54 |
| Sulfur, wt-% | 0.35 | 0.52 |
| ASTM Distillation, °F | | |
| IBP | 110 | 110 |
| 10% | 145 | 145 |
| 50% | 235 | 235 |
| 90% | 380 | 380 |
| EP | 430 | 430 |
| Octane Ratings | | |
| RON-0 | 90.5 | 90.0 |
| RON-3 | 96.5 | 95.1 |
| MON-0 | 79.6 | 79.0 |
| MON-3 | 84.4 | 83.3 |

Total cycle oil (including slurry) properties are shown in Table 4. Note that the properties of the total cycle oils indicate that they would be good feedstocks for hydrodesulfurization or more severe hydrotreating to make them suitable for further processing. Metal removal was essentially complete for vanadium and approximately 95% for nickel. In addition, the total gas oil was 100% distillable.

TABLE 4

ESTIMATED FCC GAS OIL PROPERTIES
50,000 BPD Atmospheric Reduced Crude Charge
45% Conversion

| Total Cycle Oil | Gach Saran | Kuwait |
|---|---|---|
| BPD | 27,500 | 27,500 |
| Gravity, °API | 22 | 24 |
| Sulfur, wt-% | 2.0 | 3.1 |
| $N_2$, ppm | 2,400 | 950 |
| Conradson Carbon, wt-% | 1.8 | 1.5 |
| $C_7$ Insolubles, wt-% | 0.2 | 0.2 |
| Ni/V, ppm | 0.7/0.05 | 0.7/0.05 |

TABLE 4-continued

ESTIMATED FCC GAS OIL PROPERTIES
50,000 BPD Atmospheric Reduced Crude Charge
45% Conversion

| Total Cycle Oil | Gach Saran | Kuwait |
|---|---|---|
| Bromine Number | 14 | 13 |
| ASTM D 1160 Distillation, °F | | |
| IBP | 450 | 450 |
| 10% | 550 | 540 |
| 50% | 740 | 715 |
| 90% | 925 | 900 |
| 95% | 980 | 960 |

Estimated catalyst consumption for each operation are 0.7 lb/bbl for Kuwait and 1.5 lb/bbl for Gach Saran.

Although it is not indicated in the Tables, it should be noted that essentially all of the CO, produced by the combustion of coke, would be converted to $CO_2$ and at least part of the heat of combustion would be transferred to the regenerated catalyst and hence recovered within the FCC process. This internal recovery of heat of CO combustion would permit reduction or elimination of any external feed preheat required to achieve the desired hydrocarbon reaction zone temperature. The spent regeneration gas would typically contain less than about 500 ppm CO.

It should also be noted than when charging a residuum such as Kuwait or Gach Saran, a large enough proportion of the sulfur in the charge is burned as part of the coke to require flue gas desulfurization. For instance, a 50,000 BPD unit operating in this fashion would emit 1.8 short tons/hr for Kuwait and 1.2 short tons/hr for Gach Saran of sulfur to the atmosphere as $SO_2/SO_3$. Ecologically, this is now intolerable unless such desulfurization is employed.

I claim as my invention:

1. A fluid catalytic cracking process comprising the steps of:
    a. contacting a feedstream consisting essentially of a residual oil selected from the group consisting of whole crudes and atmospheric reduced crudes, said residual oil containing at least 2 wt. % Conradson carbon, with regenerated zeolite-containing catalyst in a riser reaction zone maintained at catalytic cracking conditions selected to produce a coke yield numerically less than the sum of the wt. % Conradson carbon in the feedstream plus about 4 wt. % carbon, said cracking conditions including a temperature within the range of about 850° F. to about 1000° F. a pressure within the range of about atmospheric to about 40 psig., a hydrocarbon residence time of less than 10 seconds, and a catalyst to oil ratio of from about 3 to about 6;
    b. passing said feed and catalyst through said reaction zone maintained at said cracking conditions to form a mixture consisting of spent catalyst and hydrocarbons;
    c. discharging the mixture into cyclone separation means at separation conditions to effect the separation of hydrocarbons from spent catalyst and recovering the hydrocarbons;
    d. passing spent catalyst from said separation means into a spent catalyst stripping zone and therein stripping spent catalyst at stripping conditions to remove adsorbed and interstitial hydrocarbons therefrom to form stripped spent catalyst containing coke thereon;
    e. passing at least a portion of stripped spent catalyst to a first dense bed of fluidized particulated material maintained in a regeneration zone at a temperature within the range of about 1150° F. to about 1400° F., a superficial gas velocity within the range of about 3 to about 10 feet per second, and a catalyst residence time of less than about 2 minutes, passing fresh regeneration gas upwardly through said bed and therein oxidizing coke to produce partially spent regeneration gas, containing CO, and regenerated catalyst;

f. passing a suspension of said regenerated catalyst and partially spent regeneration gas upwardly from said bed through a dilute phase transport riser of smaller cross-sectional area than said bed and therein converting at a temperature within the range of about 1200° F. to about 1500° F. and a superficial gas velocity in the range of about 10 to about 25 feet per second CO to $CO_2$ to produce spent regeneration gas and transferring heat of CO combustion to the regenerated catalyst in the suspension;

g. discharging said suspension from the upper end of said riser and separating regenerated catalyst from spent regeneration gas and passing regenerated catalyst into a second dense bed of particulate material; and, h. passing freshly regenerated catalyst from said second dense bed to said riser reaction zone to step (a) above.

2. The process of claim 1 further characterized in that said freshly regenerated catalyst is stripped of regeneration gas in the second dense bed.

* * * * *